United States Patent
Maxik

(10) Patent No.: US 7,637,643 B2
(45) Date of Patent: Dec. 29, 2009

(54) THERMAL AND OPTICAL CONTROL IN A LIGHT FIXTURE

(75) Inventor: Fredric S. Maxik, Indialantic, FL (US)

(73) Assignee: Lighting Science Group Corporation, Dallas, TX (US)

( * ) Notice: Subject to any disclaimer, the term of this patent is extended or adjusted under 35 U.S.C. 154(b) by 0 days.

(21) Appl. No.: 11/945,385

(22) Filed: Nov. 27, 2007

(65) Prior Publication Data

US 2009/0135612 A1 May 28, 2009

(51) Int. Cl.
*F21V 29/00* (2006.01)

(52) U.S. Cl. .................. 362/373; 362/287; 362/294; 362/372

(58) Field of Classification Search .......... 362/187, 362/188, 273, 289, 294, 372, 373, 800, 199, 362/249.01, 269, 287, 427, 646
See application file for complete search history.

(56) References Cited

U.S. PATENT DOCUMENTS 6,039,461 A * 3/2000 Cummings et al. .......... 362/287
6,357,893 B1 3/2002 Belliveau
7,055,989 B2 6/2006 Galli
2003/0117797 A1 * 6/2003 Sommers et al. ............ 362/800
2005/0122713 A1 * 6/2005 Hutchins .................... 362/294
2006/0098440 A1 * 5/2006 Allen ......................... 362/294
2007/0297177 A1 * 12/2007 Wang et al. ................. 362/294

OTHER PUBLICATIONS

European Search Report; Application No. 08253830.7; Dated: Apr. 9, 2009.

* cited by examiner

*Primary Examiner*—Y My Quach Lee
(74) *Attorney, Agent, or Firm*—Cantor Colburn LLP

(57) ABSTRACT

A housing has an internally-threaded opening that opens through an external surface. A support has external threads that engage the internal threads. Radiation-emitting structure on the support emits a beam of radiation that propagates to a location remote from the housing. At the location, the beam has a width that is a function of the position of the support within the housing. According to a different aspect, a housing has an internally-threaded opening that opens through an external surface, the housing including thermally-conductive material with the internal threads thereon. A support has external threads that engage the internal threads, the support including thermally-conductive material with the external threads thereon. Radiation-emitting structure is provided on the support, and the thermally-conductive material of the support carries heat from the radiation-emitting structure to the external threads.

12 Claims, 1 Drawing Sheet

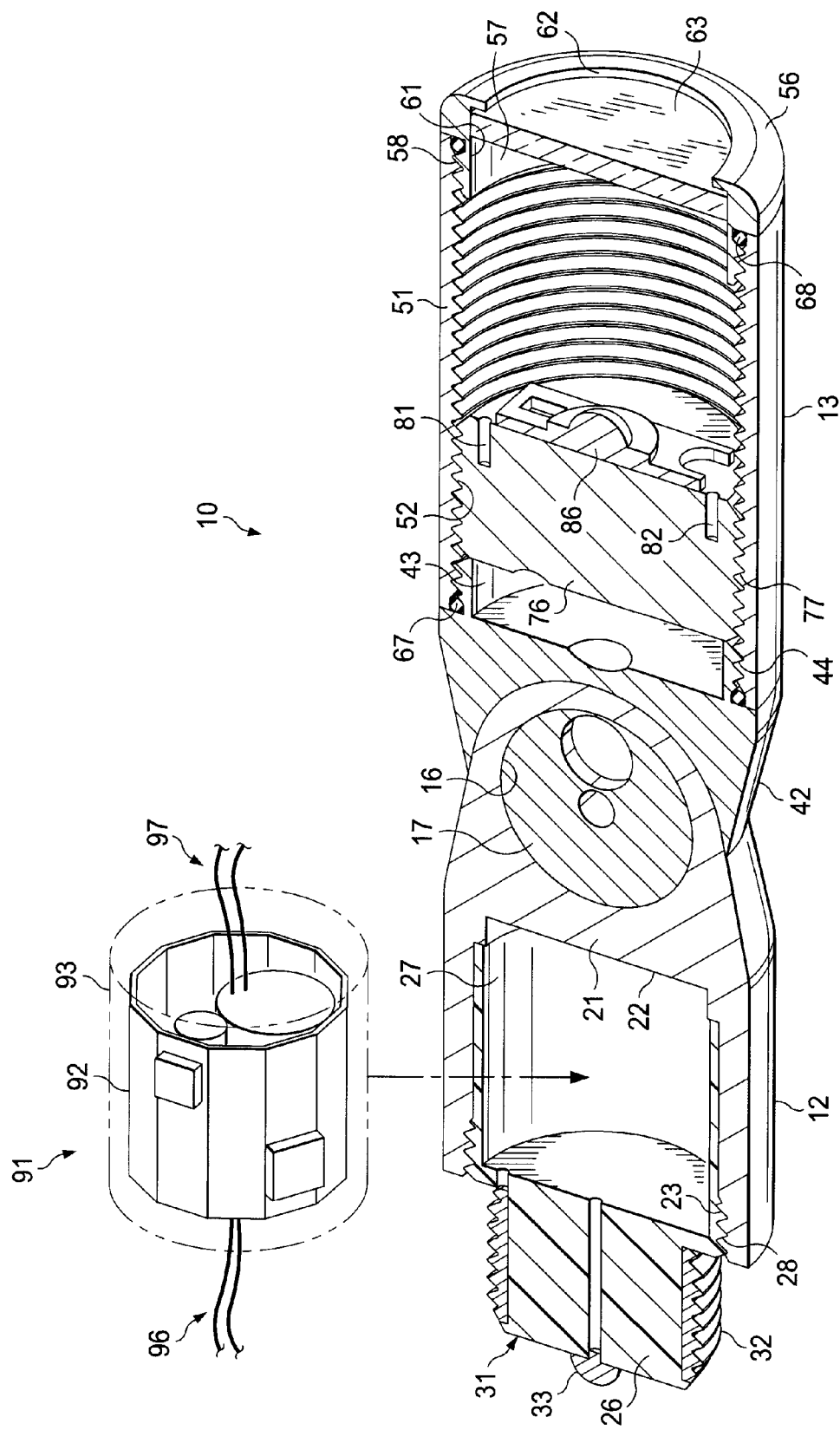

THERMAL AND OPTICAL CONTROL IN A LIGHT FIXTURE

FIELD OF THE INVENTION

This invention relates in general to light fixtures and, more particularly, to thermal and optical control techniques for light fixtures.

BACKGROUND

Over the years, a variety of different types of light fixtures have been developed. Within a light fixture, radiation is emitted by a light bulb or some other type of radiation generator. Most light fixtures involve considerations of optical control of this radiation. In addition, most light fixtures involve considerations of thermal control relating to dissipation of heat emitted by the radiation generator. Although existing techniques for optical and thermal control have been generally adequate for their intended purposes, they have not been entirely satisfactory in all respects.

BRIEF DESCRIPTION OF THE DRAWINGS

A better understanding of the present invention will be realized from the detailed description that follows, taken in conjunction with the accompanying drawing FIGURE, which is a partly exploded, sectional perspective view of a light fixture that embodies aspects of the invention.

DETAILED DESCRIPTION

The drawing FIGURE is a partly exploded, sectional perspective view of an apparatus that is a light fixture 10 embodying aspects of the invention. The light fixture 10 includes a base 12 and a housing 13. The base 12 has a cylindrical opening 16, and the housing 13 has a cylindrical projection 17 that is rotatably received within the cylindrical opening 16. The housing 13 can pivot about a not-illustrated axis with respect to the base 12 through rotation of the projection 17 within the opening 16.

The base 12 has a member 21 with the opening 16 at one end thereof. In the disclosed embodiment, the member 21 is made of aluminum, but it could alternatively be made of any other suitable material. The member 21 is generally cylindrical, except that a portion near opening 16 is tapered, and the outer end of that portion is rounded a cylindrical recess 22 extends axially into the member 21 from an end thereof remote from the opening 16. The opening 22 has internal threads 23 near its outer end.

The base 12 also has a further member 26 with a generally cylindrical portion that is disposed within the recess 22 of the member 21, and that has external threads 28 engaging the internal threads 23 on member 21. In the disclosed embodiment, the member 26 is made of an electrically insulating material, such as a commercially-available plastic, but it could alternatively be made of any other suitable material. A cylindrical recess 27 extends axially into the member 26 from an inner end thereof. The outer end of the member 26 has a base or connector 31 of a type known in the art as an E26 or E27 type connector, or a medium "Edison" connector. In a known manner, the connector 31 has external threads 32 that are made of an electrically conductive material, as well as a button 33 that is made of an electrically conductive material. The button 33 is electrically isolated from the threads 32. The connector 31 can thus be screwed into a standard socket for a standard light bulb. Although the disclosed connector 31 is a medium "Edison" connector, it could alternatively have any of a variety of other configurations, including but not limited to those known as a candelabra connector, a mogul connector, or a bayonet connector.

The housing 13 includes a member 42 that has the cylindrical projection 17 thereon. In the disclosed embodiment, the member 42 is made of aluminum, but it could alternatively be made of any other suitable material. The member 42 also has a further cylindrical projection 43 with external threads 44 thereon. The housing 13 includes a cylindrical sleeve 51 with a central cylindrical opening therethrough, and with internal threads 52 within the opening. The sleeve 51 is thermally conductive. In the disclosed embodiment, the sleeve 51 is made of aluminum, but it could alternatively be made of any other suitable material. At one end of the sleeve 51, the internal threads 52 engage the external threads 44 on the member 42. The housing 13 has a bezel 56 at an outer end remote from the member 42. In the disclosed embodiment, the bezel 56 is made of aluminum, but it could alternatively be made of any other suitable material. The bezel 56 has a cylindrical projection 57 with external threads 58 thereon. The external threads 58 engage the internal threads 52 of sleeve 51 at a location near an outer end of the sleeve. The bezel 56 has a cylindrical opening 61 extending axially therethrough, and has a radially-inwardly extending annular flange 62 at the outer end of the opening 61.

A lens 63 is mounted within the opening 61, adjacent the flange 62. In the disclosed embodiment, the lens 63 is a an optically transparent window made of glass with no optical power. However, the lens 63 could alternatively have some optical power. The lens 63 is made of a known type of durable glass, but it could alternatively be made of any other suitable material.

A resilient O-ring 67 is provided between the sleeve 51 and the cylindrical projection 43 on member 42, and a further resilient O-ring 68 is provided between the sleeve 51 and the cylindrical projection 57 on bezel 56. The O-rings 67 and 68 help to seal the housing 13 against moisture, so that the light fixture 10 can be used in outdoor applications. A cylindrical support 76 is disposed within the sleeve 51, and has external threads 77 that engage the internal threads 51 of the sleeve. The support 76 is thermally conductive and, in the disclosed embodiment, is made of aluminum. However, the support 76 could alternatively be made of any other suitable material.

The support 76 has two spaced recesses 81 and 82 therein, on a side thereof facing the bezel 56. If the bezel 56 is unscrewed and removed, a not-illustrated tool with two spaced prongs can be inserted into the sleeve 51, and positioned so that the prongs each engage one of the recesses 81 and 82. The tool can be rotated in order to rotate the support 76 with respect to the sleeve 51 of the housing. When the tool rotates the support 76 with respect to the sleeve 51, the cooperating threads 52 and 77 cause the support 76 to move axially within the sleeve 51. After adjustment of the position of the support 76, the tool is removed, and the bezel 56 is re-installed on the sleeve 51.

A light emitting module 86 is supported on the side of support 76 nearest the bezel 56, between the recesses 81 and 82. In the disclosed embodiment, the light emitting module 86 includes a semiconductor radiation generator and, more specifically, a light emitting diode (LED) that emits visible light. However, the light emitting module 86 could alternatively be any other suitable type of radiation generator, and could emit radiation in a spectrum other than the visible spectrum. When the support 76 is rotated in order to adjust its axial position within the sleeve 51, the light emitting module 86 is moved closer to or further away from the opening 61 through the bezel 56. This in turn increases or decreases the width of the light beam emitted through the bezel 56, as measured at a location spaced outwardly from the light fixture 10.

During normal operation, the light emitting module 86 produces heat. Most of this heat flows into the thermally-conductive support 76, and through the support 76 to the sleeve 51. Then, this heat flows through the sleeve 51 and is emitted into the ambient air surrounding the light fixture 10. The cooperating threads 52 and 77 facilitate this transfer of thermal energy by providing a relatively large surface area of physical contact between the support 76 and sleeve 51. In contrast, for example, if the engaging surfaces on the support 76 and sleeve 51 were purely cylindrical, the amount of surface area in direct contact between these two parts would be less than in the disclosed embodiment.

A power supply unit 91 is provided in the recess 27 within the base 12. The power supply unit 91 is a type of device known in the art. For example, the power supply unit 91 can be a device of the type disclosed in U.S. Ser. No. 11/449,138 filed Jun. 8, 2006. The power supply unit 91 includes a flexible circuit board 92 that has electrical components mounted thereon, and that is bent to form a cylindrical sleeve. The flexible circuit board 92 can optionally be embedded in a cylinder of a thermally-conductive potting material, as indicated diagrammatically by a broken line 93 in the FIGURE. The power supply unit 91 has a one pair of wires 96 that projects from one end and that are respectively electrically coupled to the threads 32 and the button 33 of connector 31.

The power supply unit 91 also has a further pair of wires 97 that projects from the opposite end. The wires of the pair 97 extend through openings in the members 21 and 42 and the support 76, and are each electrically coupled to the light emitting module 86. The wires of the pair 97 each have a length that is sufficient to accommodate rotational and axial movement of the support 76 within the sleeve 51. In the disclosed embodiment, the power supply unit 91 is designed to receive 120 volt, 60 Hz alternating current (AC) power through from the connector 31, and to convert this power into a suitable signal for driving the light emitting module 86. The signal supplied to the light emitting module 86 may be a direct current (DC) voltage, or may be a pulse width modulated (PWM) signal of a type known in the art.

Although a selected embodiment has been illustrated and described in detail, it should be understood that a variety of substitutions and alterations are possible without departing from the spirit and scope of the present invention, as defined by the claims that follow.

What is claimed is:

1. An apparatus comprising:
   a base;
   a housing pivotally connected to said base, said housing having an external surface and having an opening therein that extends in a direction and that opens at one end through said external surface, said opening having internal threads, and said housing including thermally conductive material with said internal threads thereon;
   a support that is disposed in said opening and that has external threads engaging said internal threads, said external threads being responsive to rotation of said support with respect to said housing for causing said support to move parallel to said direction within said opening in relation to said housing, said support including thermally-conductive material that has said external threads thereon; and
   a radiation-emitting structure supported on a side of said support nearest said end of said opening, said thermally-conductive material of said support carrying heat from said radiation-emitting structure to said external threads;
   wherein said base comprises an electrical connector at one end configured to provide electrical power to said radiation-emitting structure, and a pivotal joint at an opposing end where said housing is pivotally connected.

2. An apparatus according to claim 1, wherein said radiation-emitting structure emits a beam of radiation that propagates within said opening and through said end of said opening to a location remote from said housing, and wherein at said location said beam has a width that is a function of a position of said support within said housing.

3. An apparatus according to claim 1, wherein said radiation-emitting structure includes radiation-emitting semiconductor structure.

4. An apparatus according to claim 3, wherein said semiconductor structure includes a light emitting diode.

5. An apparatus according to claim 1, wherein said base comprises an axial recess disposed between said connector and said pivotal joint, said apparatus further comprising a power unit disposed within said recess, said power unit in electrical communication with said electrical connector and said radiation-emitting structure.

6. An apparatus according to claim 5, wherein said recess comprises a cylindrical recess, and wherein said power unit comprises a flexible circuit board conformable to and disposed within said cylindrical recess.

7. An apparatus according to claim 6, wherein said flexible circuit board is embedded in said cylindrical recess via a thermally conductive potting material.

8. An apparatus according to claim 5, wherein said radiation-emitting structure comprises a light emitting diode, and wherein said power unit is configured to receive and convert 120 volt alternating current into a suitable signal for driving said light emitting diode.

9. An apparatus of claim 8, wherein said suitable signal comprises a direct current voltage or a pulse width modulated signal.

10. An apparatus according to claim 1, wherein said electrical connector comprises an E26 connector, an E27 connector, or a medium Edison-type connector.

11. An apparatus according to claim 1, further comprising a bezel and an optically transparent lens disposed at said one end of said housing, and a resilient O-ring disposed between said bezel and said housing for sealing said housing against moisture.

12. An apparatus according to claim 1, wherein said support comprises two spaced apart recesses on a side facing said opening of said housing, said two spaced apart recesses providing means for causing said support to move parallel to said direction within said opening in relation to said housing.

* * * * *